Feb. 24, 1942. E. H. HUGENHOLTZ 2,274,546
RADIO COMPASS
Filed Nov. 13, 1939 3 Sheets-Sheet 1
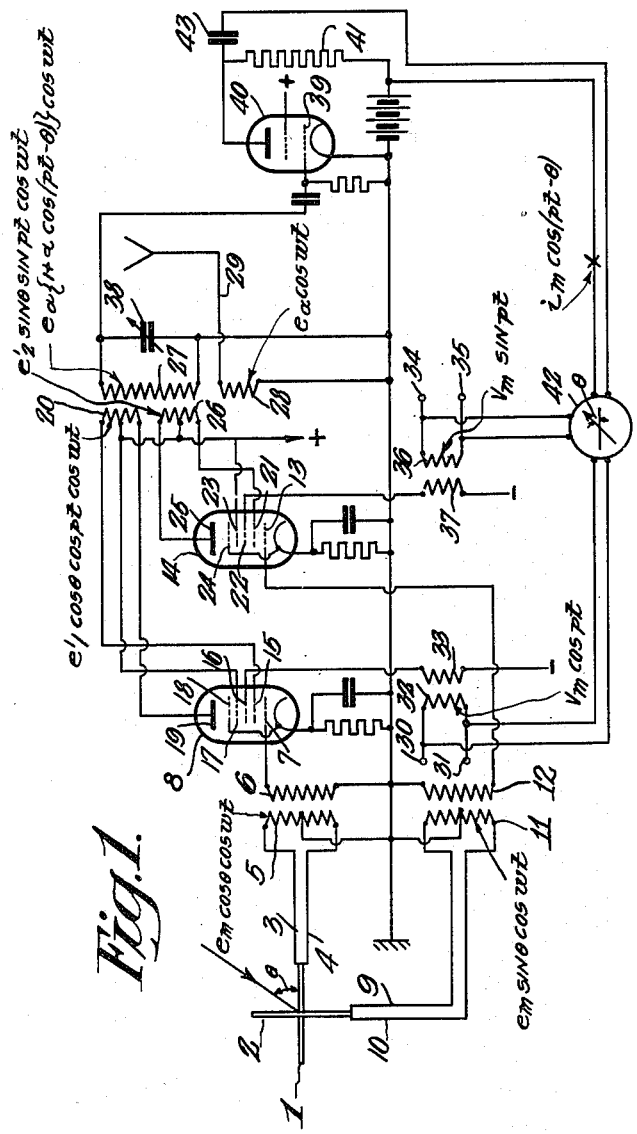
Inventor
EDUARD H. HUGENHOLTZ
By
Attorney

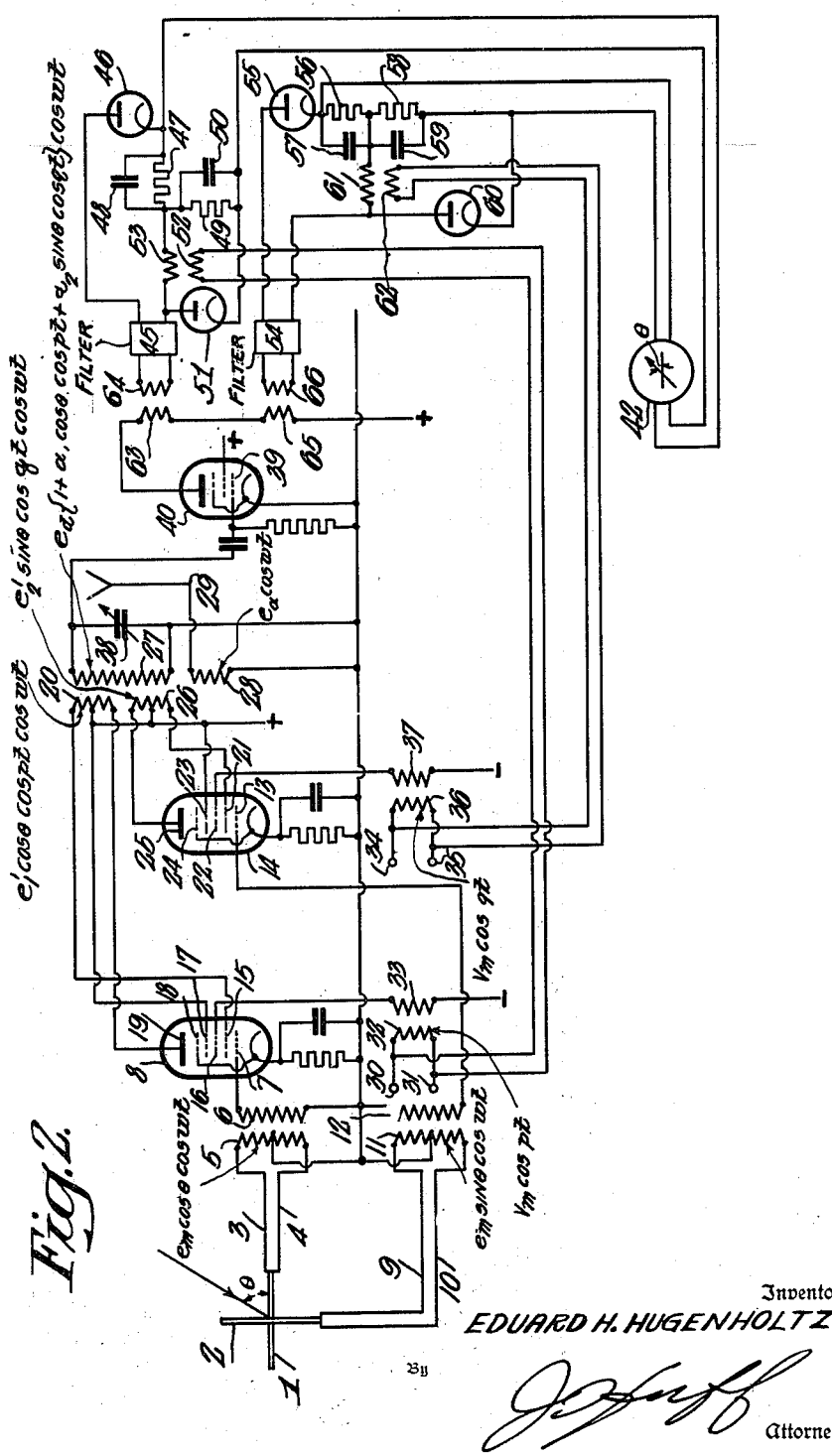

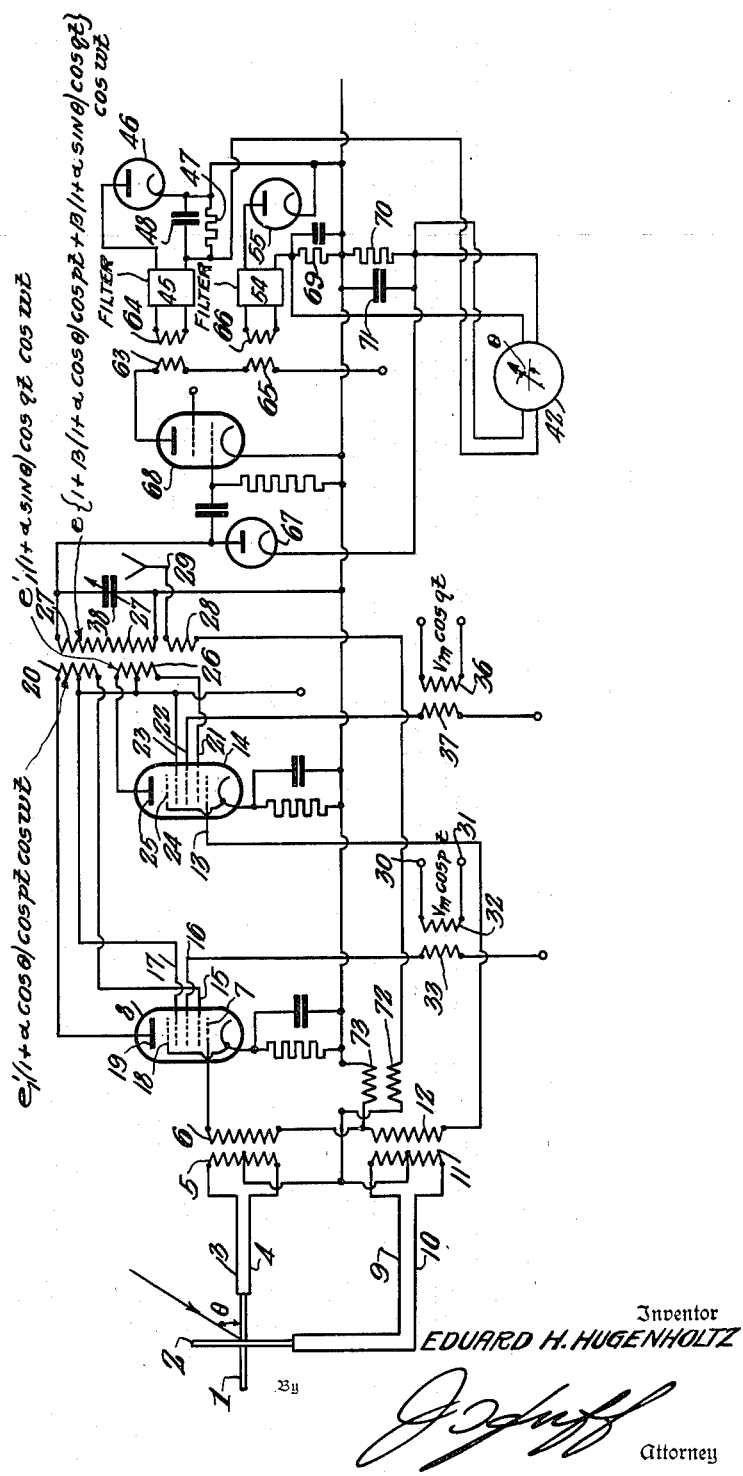

Patented Feb. 24, 1942

2,274,546

UNITED STATES PATENT OFFICE 2,274,546

RADIO COMPASS

Eduard Herman Hugenholtz, Hilversum, Netherlands, assignor to Radio Corporation of America, a corporation of Delaware Application November 13, 1939, Serial No. 303,935
In the Netherlands November 12, 1938

4 Claims. (Cl. 250—11)

(Granted under the provisions of sec. 14, act of
March 2, 1927; 357 O. G. 5)

This invention relates to a radio compass of the known type, wherein the waves of the station whose bearings are to be taken are received in two loop aerials placed perpendicularly to one another (a so-called cross-loop) and in a fixed aerial without directional effect.

The invention has for its purpose a similar compass of such a construction that the direction of the waves incident on the cross-loops is immediately indicated by a measuring instrument.

The device with which this object is realized according to the invention operates in such manner that the two voltages supplied by the cross-loops are successively modulated either before or after combination with a voltage which is taken from the aerial, by auxiliary voltages either of different phase or of different frequency. The two voltages thus modulated, if desired together with a voltage originating from the aerial, are so combined and detected that, when supplied to a measuring instrument, they give a direct indication of the angle at which the incoming waves reach the cross-loops.

If the compass is so designed that the two modulating auxiliary voltages are different in phase, the modulated loop voltages can, according to the invention, be combined with one another and with a voltage originating from the fixed aerial, detected and supplied to a phase meter. The meter then gives a direct reading of the direction, since the direction becomes manifest as a phase difference between the modulated and detected voltage on the one side and the modulating auxiliary voltages on the other side.

If the two modulating auxiliary voltages are not different in phase but different in frequency, it is also possible to modulate after each of the two voltages from the loops first has been combined with a voltage originating from the fixed aerial. Subsequently, the two modulated voltages thus produced are together detected and split up in accordance with the two modulation frequencies which must be adequately different from one another. Thereupon, the two voltages thus produced are redetected, freed from their alternating current components by compensation and successively supplied as direct current voltages to the turns of a cross-coil instrument or another indicator in which two spatial components determine the reading. This indicator then immediately indicates the direction to be determined.

The invention will be more clearly understood by reference to the accompanying drawings showing, by way of example, some embodiments of these two alternatives.

Figure 1 is a schematic circuit diagram of one embodiment of the invention; and Figures 2 and 3 are schematic circuit diagrams of modified species of the invention. In describing the several figures of the drawings, similar reference numerals will be used to identify similar elements.

Referring to the diagram of Fig. 1, the waves arriving from the station whose bearings are to be taken are received in cross-loop aerials 1, 2 and in a nondirectional aerial 29. The currents of one loop 1, which is struck by the incoming waves at an angle $\theta$, are led along conductors 3, 4 to a centre-earthed primary inductor 5 which is coupled to a secondary inductor 6. The latter is interposed between earth and a control grid 7 of a multielectrode tube 8. The currents of the other loop 2 are led along conductors 9, 10 to a centre-earthed primary inductor 11 which is coupled to a secondary inductor 12, the latter being located between earth and a grid 13 of a second electronic tube 14 which is similar to the tube 8. In this way, the grid 7 has impressed on it a voltage which is equal to $e_m \cos \theta \cos \omega t$, and the grid 13, a voltage equal to $e_m \sin \theta \cos \omega t$. The tube 8 is further provided with additional grids 15, 16, 17 and 18 and with an anode 19. Between the latter 19 and the grid 15 is connected an output inductor 20 of the tube 8, said inductor being centre-tapped and the tap connected to the grid 17 of the tube 8 and to the positive pole of a source of direct current. The tube 14 has four additional grids 21, 22, 23 and 24 and an anode 25. The latter 25 is connected to the grid 21 through an output inductor 26. The centre of the output inductor 26 is connected to the centre of the output inductor 20 and consequently also to the positive pole of the source of supply. The two output inductors 20 and 26 are inductively coupled to a third inductor 27 which can be tuned by means of a variable condenser 38. The third inductor 27 is further connected to a fourth inductor 28 which is located in the lead between the aerial 29 and earth. For the sake of simplicity, any elements serving to bring the voltages of the aerial and loops as much as possible in phase have been omitted.

Between two terminals 30 and 31, across which a voltage $V_m \cos pt$ is established, is connected a primary 32 which is coupled to a secondary 33 which has one terminal connected to the second control grid 16 of the tube 8 and the other terminal to a point of negative potential. Between two additional terminals 34, 35, across which a voltage $V_m \sin pt$ is established, is connected a primary 36 which is coupled through a secondary 37 to the second control grid 22 of the tube 14. The output electrodes 15 and 19, and 21 and 25 form the balanced output circuits of balanced modulators in which the modulation voltages are applied to the intermediate grid electrodes 16 and 22 so that the carrier voltages are suppressed as in the case of conventional balanced modulators. The alternating currents impressed on the first control grids of tubes 8 and 14 are thus modulated, with suppressed carrier waves, by the two voltages set up between 30, 31 and 34, 35 respectively which may be, for example, low frequency voltages. Thus a voltage $$e'_1 \cos \theta \cos pt \cos \omega t$$

is impressed on the circuit 27, 38 by means of the output inductor 20 and a voltage $$e'_2 \sin \theta \sin pt \cos \omega t$$

through the output inductor 26. If, in addition, a voltage $e_a \cos wt$ is induced in the circuit 27, 38 through the fourth inductor 28, the resulting voltage in the circuit 27, 38, assuming that $e'_1 = e'_2$ and $$\frac{e'_1}{e_a} = \omega$$

will be:

$$e_a \{1 + \omega \cos (pt - \theta)\} \cos wt$$

This voltage is set up at a grid 39 of a thermionic tube 40 and detected. A resistance 41 is connected in the output circuit of the tube 40. The alternating current voltages produced across this resistance are supplied through a blocking condenser 43 to the moving coil of a measuring instrument 42. Furthermore, a rotation field is excited in this instrument with the aid of the two voltages $V_m \cos pt$ and $V_m \sin pt$ which are 90° different in phase. Since the current in the moving coil will be equal to $i_m \cos (pt - \theta)$, the pointer of the instrument 42 will adjust itself at an angle $\theta$ and thus give a direct indication of the direction under which waves of the station whose bearings are to be taken reach the loop 1.

In the construction of Fig. 2, the signals to be received are modulated and combined in a circuit arrangement which initially is similar to that of Fig. 1. However, the terminals 30 and 31 have the alternating current voltage $V_m \cos pt$ applied to them, and the terminals 34 and 35, the alternating current voltage $V_m \cos qt$, consequently with a divergent frequency. A voltage is now induced in the circuit 27, 38 by the output inductor 20, which voltage is equal to $e'_1 \cos \theta \cos pt \cos wt$. By the output inductor 26 is induced $e'_2 \sin \theta \cos qt \cos wt$ and by the fourth inductor 28, $e_a \cos wt$. Postulating $$\frac{e'_1}{e_a} = \omega_1$$

and $$\frac{e'_2}{e_a} = \omega_2$$

the circuit has a voltage produced in it which is equal to $e_a(1 + \omega_1 \cos \theta \cos pt + \omega_2 \sin \theta \cos qt) \cos wt$. After detection by the tube 40, the anode circuit has produced in it as an alternating current component of the detected current: $i_a \omega_1 \cos \theta \cos pt + i_a \omega_2 \sin \theta \cos qt$. This current flows through the primaries 63 and 65 and induces in the secondaries 64 and 66 a voltage: $e''(\omega_1 \cos \theta \cos pt + \omega_2 \sin \theta \cos qt)$. The reference numeral 45 indicates a filter which solely transmits alternating currents having the angular frequency $p$. An alternating voltage $e_1'' \cos \theta pt$ will then be set up between the output terminals of the filter 45. By means of a primary coil 52, a voltage is induced in a secondary coil 53 equal to $V_m \cos pt$. Taking $$\frac{e_1''}{V_m} = \beta_1$$

then at the rectifying tube 46 is established a voltage $V_m(1 + \beta_1 \cos \theta) \cos pt$. The potential of the direct current across a resistor 47 brought about by detection becomes $V_m(1 + \beta_1 \cos \theta)$. Furthermore, the alternating current voltage $V_m \cos pt$ is detected by the rectifying tube 51. This supplies a direct current having a potential $V_m$ across a resistor 49. If $V_m$ is sufficiently constant, the compensation voltages $V_m$ obtained in this case by detection may also be derived without further means from the source of direct current. A direct current of potential $V_m \beta_1 \cos \theta$ is set up as a difference between the conductors leading from 49 and 47 to the instrument 42, if the internal resistance of the instrument is very high. The alternating voltages set up across a coil 66 are supplied to a filter 54 which exclusively transmits alternating currents having the angular frequency $q$. Consequently, an alternating voltage $e_2'' \sin \theta \cos qt$ is set up between the output terminals of the filter 54. Moreover, by means of a primary coil 62, a voltage $(V_m \cos qt)$ is induced in a secondary coil 61.

Taking $$\frac{e_2''}{V_m} = \beta_2$$

there is set up at the rectifying tube 55 a voltage: $V_m(1 + \beta_2 \sin \theta) \cos qt$. The potential of direct current across a resistor 56 produced by detection becomes $V_m(1 + \beta_2 \sin \theta)$. Moreover, the alternating voltage $V_m \cos qt$ is detected by the rectifying tube 60. This supplies a direct current of potential $V_m$ across a resistor 58.

A direct current $V_m \beta_2 \sin \theta$ is set up as a potential difference between the conductors leading from the resistor 56 and the resistor 58 to an indicating instrument 42, if the internal resistance of the instrument is very high. If the instrument 42 is, for example, a cross-coil instrument, it will immediately indicate the angle $\theta$, if $\beta_1 = \beta_2$.

In the example of Fig. 3, the high frequency alternating current induced in the first loop 1 is induced in the inductor 6 by means of an inductor 5, so that the voltage $e_1 = e_m \cos \theta \cos wt$ is set up at the grid 7. Moreover, the alternating current generated in the aerial 29 supplies a current through inductors 28 and 72. A voltage $e_a \cos wt$ is thus induced by the inductor 72 in an inductor 73 coupled thereto. In this case, any elements which may be required for obtaining the exact phase between the alternating currents of the aerial and loops are not shown.

Taking $$\frac{e_m}{e_a} = \omega$$

the alternating voltage set up at the grid 7 can be represented by the expression: $e_a(1 + \omega \cos \theta) \cos wt$. Furthermore, the alternating voltage $V_m \cos pt$ is induced at grid 16 of the tube 8 by the coupled inductors 32 and 33 with the result that in the tube the alternating voltage set up at the grid 7 is modulated by said voltage to obtain a suppressed carrier wave. Due to the anode current of the tube 8, a voltage $e'(1 + \omega \cos \theta) \cos pt \cos wt$ is induced in coil 27 by coil 20.

The alternating current induced in the other loop 2 supplies an alternating voltage $e_2 = e_m \sin \theta \cos wt$ on grid 13 of tube 14 through the coupled inductors 11 and 12. Moreover, at this grid is also set up the E. M. F. $e_a \cos wt$ induced in inductor 73. The total alternating voltage set up at grid 13 can be represented by the expression: $e_a (1+\omega \sin \theta) \cos wt$. The alternating voltage $V_m \cos qt$ is induced by inductors 36 and 37 on grid 22 of tube 14. In the tube, the alternating current voltage set up at grid 13 is modulated by said alternating voltage to obtain a suppressed carrier wave. Due to the anode current of tube 14, there is induced in inductor 27 by inductor 26: $e' (1+\omega \sin \theta) \cos qt \cos wt$. Further, a voltage $e \cos wt$ derived from the aerial is induced in inductor 27 by inductor 28. Taking $$\frac{e'}{e} = \beta$$

then the total voltage induced in the circuit 27, 38 can be represented by the expression: $e(1+\beta (1+\omega \cos \theta) \cos pt+\beta (1+\omega \sin \theta) \cos qt) \cos wt$. This alternating voltage is set up at the grid of tube 68 and supplies as detection result an anode current: $i_m (1+\beta (1+\omega \cos \theta) \cos pt+\beta (1+\omega \sin \theta) \cos qt)$. This current induces corresponding alternating currents in coil 64 by coil 63 and in coil 66 by coil 65. By 45 is again designated a filter designed in such manner that it exclusively transmits alternating currents having an angular frequency $p$. Consequently, an alternating voltage according to the expression $e_m (1+\omega \cos \theta) \cos pt$ is set up at the rectifying tube 46. The potential of the direct current across the resistance 47 produced by rectification is according to the expression $V_m (1+\omega \cos \theta)$. The alternating current across the circuit 27, 38 is, in addition, rectified by a tube 67 in series with a resistor 70. By a proper choice of the various magnitudes, it can be ensured that the rectified voltage across the resistor 70 is exactly $V_m$. Between the conductors leading from resistors 47 and 70 to the meter 42, is now set up the difference of the voltages across those resistors, i. e., $V_m (1+\omega \cos \theta) - V_m = V_m \omega \cos \theta$. If 42 represents a cross-coil instrument, this voltage consequently is set up across the one coil. The voltage induced in coil 66 is set up at the filter 54 which again exclusively transmits voltages having the angular frequency $q$. The rectifying tube 55 has now applied to it an alternating voltage according to the expression: $e_m (1+\omega \sin \theta) \cos qt$. A direct current of potential $V_m (1+\omega \sin \theta)$ is produced across the resistor 69 by rectification. Between the conductors leading from the resistors 69 and 70 to the meter 42, there is produced a voltage difference: $V_m (1+\omega \sin \theta) - V_m = V_m \omega \sin \theta$. This voltage is set up at the cross-coil of the instrument. The instrument indicates the angle $\theta$ by combination. It should be understood that any antenna system having crossed patterns of the type produced by crossed loops may be substituted for the crossed loop system. For example, Adcock antennas or dipoles may be used.

I claim as my invention:

1. A radio compass having a pair of crossed directional antennas and a nondirectional antenna, means for modulating with distinctive currents the currents derived from waves intercepted by said directional antennas, means including at least a portion of said modulating means for suppressing the currents corresponding to the carrier frequency of said waves, means for deriving a current from said nondirectional antenna, means for combining the current from said antenna with said currents less said currents of carrier frequency derived from said directional antennas, means for detecting the thus modulated and combined currents, means for rectifying the detected currents, means for rectifying the modulating currents, means for combining the rectified detected currents and the rectified modulating currents to form two currents bearing directional information, a directional indicator, and means for applying the said two currents bearing directional information to said indicator to indicate the angle between the said wave fronts and one of said directional antennas.

2. A radio compass having a pair of crossed directional antennas and a nondirectional antenna, means for modulating with currents of different frequency the currents derived from waves intercepted by said directional antennas, means for deriving a current from said nondirectional antenna, means for combining the current from said antenna with said currents derived from said directional antennas, means for detecting the thus modulated and combined currents, means for rectifying said detected currents, means for rectifying the modulating currents of different frequency, means for combining the rectified detected currents and the rectified modulating currents, a directional indicator, and means for applying the two combined rectified currents to said indicator to indicate the angle between the said wave fronts and one of said directional antennas.

3. A radio compass having a pair of crossed directional antennas and a nondirectional antenna, means for modulating with currents of different frequency the currents derived from waves intercepted by said directional antennas, means for deriving a current from said nondirectional antenna, means for combining the current from said antenna with said currents derived from said directional antennas, means for detecting the thus modulated and combined currents, a filter for separating the currents of different frequencies after detection, means for rectifying the separated currents, means for rectifying said modulation currents of different frequencies, means for combining the rectified detected currents with the rectified modulation currents to form two currents, a directional indicator, and means for applying the two combined rectified currents to said indicator to indicate the angle between the said waves and one of said directional antennas.

4. A radio compass having a pair of crossed directional antennas and a nondirectional antenna, means for modulating with currents of different frequency the currents derived from waves intercepted by said directional antennas, means for deriving a current from said nondirectional antenna, means for combining the current from said antenna with said currents derived from said directional antennas, means for detecting the thus modulated and combined currents, a filter for separating the currents of different frequencies after detection, means for rectifying the separated currents, means for separately rectifying said modulation currents of different frequencies, means for combining the rectified detected currents with the rectified modulation currents to form two currents, a directional indicator, and means for applying the two combined rectified currents to said indicator to indicate the angle between the said wave fronts and one of said directional antennas.

EDUARD HERMAN HUGENHOLTZ.